(12) United States Patent
Yamada

(10) Patent No.: US 9,554,079 B2
(45) Date of Patent: Jan. 24, 2017

(54) VEHICLE-MOUNTED ELECTRONIC DEVICE

(71) Applicant: Panasonic Corporation, Osaka (JP)

(72) Inventor: Tomohiro Yamada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 14/377,564

(22) PCT Filed: Mar. 12, 2013

(86) PCT No.: PCT/JP2013/001582
§ 371 (c)(1),
(2) Date: Aug. 8, 2014

(87) PCT Pub. No.: WO2013/136767
PCT Pub. Date: Sep. 19, 2013

(65) Prior Publication Data
US 2015/0002673 A1    Jan. 1, 2015

(30) Foreign Application Priority Data

Mar. 13, 2012   (JP) ................................. 2012-055586

(51) Int. Cl.
*H04N 7/18*     (2006.01)
*H04N 9/47*     (2006.01)
(Continued)

(52) U.S. Cl.
CPC ........... *H04N 5/655* (2013.01); *B60R 11/0235* (2013.01); *B60R 11/04* (2013.01);
(Continued)

(58) Field of Classification Search
None
See application file for complete search history.

(56) References Cited

U.S. PATENT DOCUMENTS 4,367,923 A * 1/1983 Ishikawa ................ B60Q 3/004
                                                    345/102
4,793,690 A * 12/1988 Gahan ..................... B60R 1/088
                                                    250/214 D
(Continued)

FOREIGN PATENT DOCUMENTS

JP    09-265271 A    10/1997
JP    2006-111186 A   4/2006
(Continued)

OTHER PUBLICATIONS

International Search Report for Application No. for PCT/JP2013/001582 dated Jun. 18, 2013.
(Continued)

*Primary Examiner* — Frederick Bailey
*Assistant Examiner* — Talha M Nawaz
(74) *Attorney, Agent, or Firm* — Pearne & Gordon LLP

(57) ABSTRACT

A vehicle-mounted electronic device according to the present invention is provided with a sensor 15 that detects illumination 17 from a following vehicle 16, in at least one of a display unit 9 and a main body case 7, and is configured such that a control unit 11 rotates the display unit 9 by means of a drive unit 10 when the sensor 15 detects the illumination 17 from the following vehicle 16. Thereby, the illumination 17 from the following vehicle 16 does not reflect on the display unit 9 toward a viewer, as a result of which, the influence by illumination from the following vehicle 16 can be reduced.

4 Claims, 6 Drawing Sheets

(51) Int. Cl.
  *H04N 5/655* (2006.01)
  *G01C 21/26* (2006.01)
  *B60R 11/02* (2006.01)
  *B60R 11/04* (2006.01)
  *B60R 11/00* (2006.01)

(52) U.S. Cl.
  CPC .... *G01C 21/265* (2013.01); *B60R 2011/0028* (2013.01); *B60R 2011/0082* (2013.01); *B60R 2011/0085* (2013.01); *B60R 2011/0276* (2013.01)

(56) References Cited

U.S. PATENT DOCUMENTS

| | | | | |
|---|---|---|---|---|
| 4,985,667 | A * | 1/1991 | Kuhn | B60R 1/087 318/567 |
| 5,193,029 | A * | 3/1993 | Schofield | B60Q 1/14 250/200 |
| 5,579,178 | A * | 11/1996 | Mochizuki | B60R 1/074 359/841 |
| 6,193,380 | B1 * | 2/2001 | Jacobs | G08G 1/167 340/903 |
| 8,768,561 | B2 * | 7/2014 | Smith | B60H 1/00392 701/29.1 |
| 2002/0003571 | A1 * | 1/2002 | Schofield | B60C 23/00 348/148 |
| 2002/0140687 | A1 * | 10/2002 | Takeda | B60R 11/0235 345/204 |
| 2003/0125873 | A1 * | 7/2003 | Yamaguchi | B60K 35/00 701/400 |
| 2006/0022003 | A1 * | 2/2006 | Zheng | B60R 11/0235 224/275 |
| 2006/0061008 | A1 * | 3/2006 | Karner | B29C 45/0017 264/250 |
| 2007/0247717 | A1 * | 10/2007 | Konno | G02B 27/01 359/613 |
| 2008/0159556 | A1 * | 7/2008 | Ambrose | B60R 11/02 381/86 |
| 2009/0067073 | A1 * | 3/2009 | Vanderslik | B62J 29/00 359/841 |
| 2009/0102922 | A1 | 4/2009 | Ito | |
| 2009/0128317 | A1 | 5/2009 | Hideshiro | |
| 2010/0097469 | A1 * | 4/2010 | Blank | B60R 1/12 348/148 |
| 2010/0328055 | A1 * | 12/2010 | Fong | B60Q 9/005 340/425.5 |
| 2011/0035099 | A1 * | 2/2011 | Kobayashi | B60K 35/00 701/36 |
| 2011/0170023 | A1 * | 7/2011 | Ishida | B60K 35/00 348/837 |
| 2011/0181728 | A1 * | 7/2011 | Tieman | B60R 1/00 348/148 |
| 2011/0188122 | A1 * | 8/2011 | Habibi | B60R 1/08 359/604 |
| 2012/0050626 | A1 * | 3/2012 | Tsuzuki | B60R 11/0235 348/837 |
| 2012/0154591 | A1 * | 6/2012 | Baur | B60R 1/00 348/148 |
| 2013/0229519 | A1 * | 9/2013 | Kavuru | B60R 11/04 348/148 |
| 2013/0265431 | A1 * | 10/2013 | Hattori | H04N 7/18 348/148 |
| 2014/0043214 | A1 * | 2/2014 | Park | G06F 1/163 345/8 |
| 2014/0160012 | A1 * | 6/2014 | Su | G06F 3/005 345/156 |

FOREIGN PATENT DOCUMENTS

| | | |
|---|---|---|
| JP | 2006-192972 A | 7/2006 |
| JP | 2009-075988 A | 4/2009 |
| JP | 2009-105660 A | 5/2009 |
| JP | 2009-120070 A | 6/2009 |

OTHER PUBLICATIONS

Office Action issued in Japanese Patent Application No. 2014-504692 dated Dec. 6, 2016.

* cited by examiner

VEHICLE-MOUNTED ELECTRONIC DEVICE

TECHNICAL FIELD

The present invention relates to a vehicle-mounted electronic device to be attached to a ceiling surface of a vehicle.

BACKGROUND ART

For example, vehicle-mounted electronic devices such as a car navigation device and a television receiver are often attached to the vicinities of front panels of vehicle interiors, and when the vehicle-mounted electronic devices are used in places like these, the display units become extremely difficult to see, depending on the incidence state of sunlight.

Consequently, an electronic device that stores the influence of sunlight of each season, and adjusts illuminance or the like of the display unit has been proposed (for example, Patent Literature 1 as follows).

CITATION LIST

Patent Literature

Patent Literature 1: Japanese Patent Laid-Open No. 09-265271

SUMMARY OF INVENTION

Technical Problem

The above described conventional example has an object thereof limited to reduction in difficulty to see the display unit due to sunlight, and does not take the influence by illumination from a following vehicle into consideration. Therefore, the difficulty to see the display unit by illumination from the following vehicle at night cannot be reduced.

However, it is a common experience to receive illumination from the headlights from a following vehicle for a long time since the following vehicle moves via the same route, while driving a vehicle at night. In such a case, the state in which the display unit is difficult to see by illumination from the following vehicle indefinitely continues for a long period of time.

The present invention is made in the light of the problem as above, and an object of the present invention is to reduce an influence by illumination of a following vehicle and to make a usage environment of a vehicle-mounted electronic device comfortable.

Solution to Problem

In order to attain the above described object, a vehicle-mounted electronic device according to the present invention includes a main body case to be attached to a ceiling surface of a vehicle, a display unit that is attached to the main body case to be openable downward and closable, a drive unit that drives the display unit to open and close, and a control unit that is connected to the drive unit, and includes a configuration in which a sensor that detects illumination from a following vehicle is provided in at least one of the display unit and the main body case, and the control unit rotates the display unit by means of the drive unit, when the sensor detects illumination from a following vehicle.

Advantageous Effects of Invention

The vehicle-mounted electronic device according to the present invention includes a main body case to be attached to a ceiling surface of a vehicle, a display unit that is attached to the main body case to be openable downward and closable, a drive unit that drives the display unit to open and close, and a control unit that is connected to the drive unit, and is configured such that a sensor that detects illumination from a following vehicle is provided in at least one of the display unit and the main body case, and the control unit rotates the display unit by means of the drive unit, when the sensor detects illumination from a following vehicle. Therefore, the influence by illumination from a following vehicle can be reduced.

When the display unit of the vehicle-mounted electronic device is attached to the main body case attached to the ceiling surface of a vehicle to be openable downward and closable, the display unit extremely easily receives the influence by the illumination of a following vehicle.

Therefore, in the present invention, the sensor that detects illumination from the following vehicle is provided in at least one of the display unit and the main body case. The control unit rotates the display unit by means of the drive unit when illumination from the following vehicle is detected by the sensor. By adopting the configuration like this, illumination from the following vehicle does not reflect on the display unit toward a viewer. As a result, the influence by the illumination of the following vehicle is reduced, and the usage environment of the vehicle-mounted electronic device can be made comfortable.

DESCRIPTION OF EMBODIMENTS

Hereinafter, one embodiment of the present invention will be described with use of the accompanying drawings.

Embodiment 1

Figure 1:
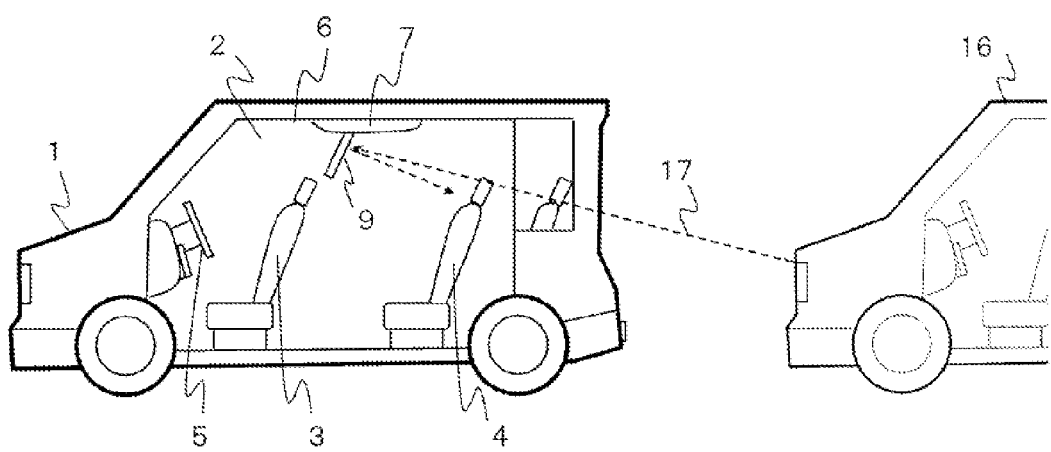
FIG. 1 is a view showing a vehicle loaded with a vehicle-mounted electronic device of one embodiment of the present invention.

FIG. 1 is a view showing a vehicle loaded with a vehicle-mounted electronic device of one embodiment of the present invention. In the drawing, reference sign 1 designates a vehicle loaded with the vehicle-mounted electronic device according to the present invention, a front seat 3 is disposed at the front of a vehicle interior 2, and a rear seat 4 is disposed at the rear.

Further, a steering wheel 5 is disposed in front of the front seat 3 in the vehicle interior 2, and the vehicle-mounted electronic device 7 including a display unit 9 is attached to a part between the front seat 3 and the rear seat 4, of a ceiling surface 6 of the vehicle interior 2.

Figure 2:
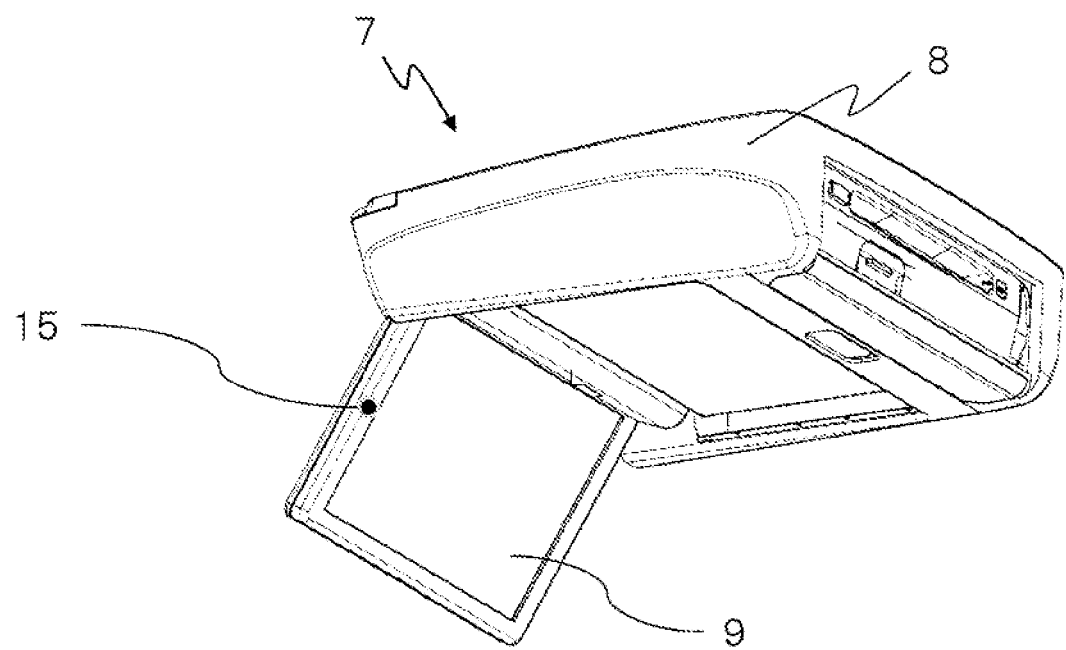
FIG. 2 is a perspective view of the vehicle-mounted electronic device of the same.
Figure 3:
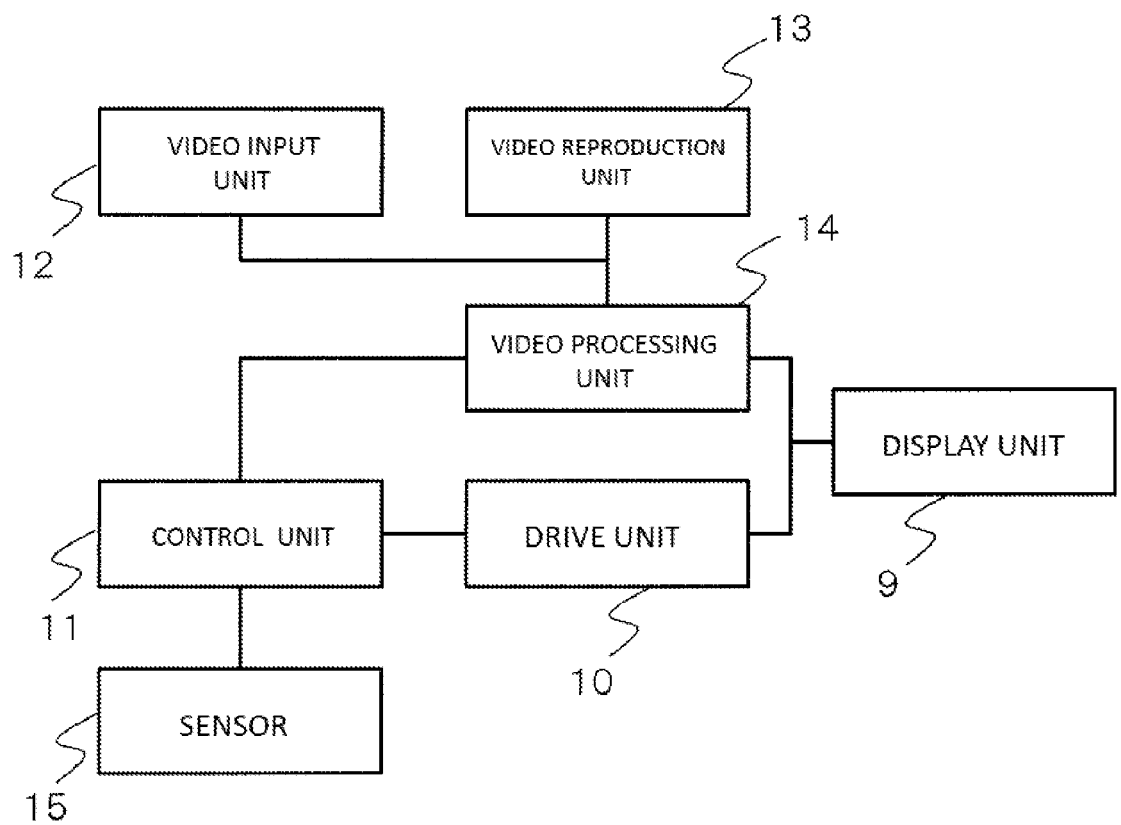
FIG. 3 is a control block diagram of the same.

FIG. 2 is a perspective view of the vehicle-mounted electronic device 7, and FIG. 3 is a control block diagram of the vehicle-mounted electronic device 7.

As shown in FIG. 2, the vehicle-mounted electronic device 7 includes a main body case 8 to be attached to the ceiling surface 6, and the display unit 9 that is attached to the main body case 8 to be openable downward and closable. Further, at an outer perimeter portion of the display unit 9, a sensor 15 formed by a camera facing rearward is provided, and by the sensor 15, illumination from a following vehicle is detected. Note that the sensor 15 like this may be provided at the main body case 8 side.

Further, in the main body case 8, a drive unit 10 that drives the display unit 9 to open and close, and a control unit 11 connected to the drive unit 10 are contained as shown in a block diagram of FIG. 3. A video input unit 12, a video reproduction unit 13 and a video processing unit 14 are connected to the control unit 11 so that videos of various media and a television video can be viewed.

When a fellow passenger sitting in the rear seat 4 views the video on the display unit 9, the display unit 9 is brought into a state in which the display unit 9 is opened at 90 degrees or more with respect to the main body case 8 as illustrated in FIG. 1 and FIG. 2.

The feature in the present embodiment lies in that the sensor 15 formed by a camera facing rearward is provided at the outer perimeter portion of the display unit 9, and the sensor 15 is connected to the control unit 11. The control unit 11 is configured to rotate the display unit 9 by means of the drive unit 10 when the sensor 15 detects illumination from a following vehicle.

Hereinafter, the feature will be mainly described.

In the state shown in FIG. 1, the display unit 9 of the vehicle-mounted electronic device 7 is opened at 90 degrees or more with respect to the main body case 8, and the fellow passenger sitting in the rear seat 4 views the video on the display unit 9.

However, when a following vehicle 16 with headlights lit follows while the display unit 9 is in the open state as above, illumination 17 from the headlights of the following vehicle 16 is also incident on the display unit 9. The illuminating light reflects on the display unit 9 toward the face of the fellow passenger sitting in the rear seat 4, and the video is extremely difficult to see for the fellow passenger.

Figure 4:
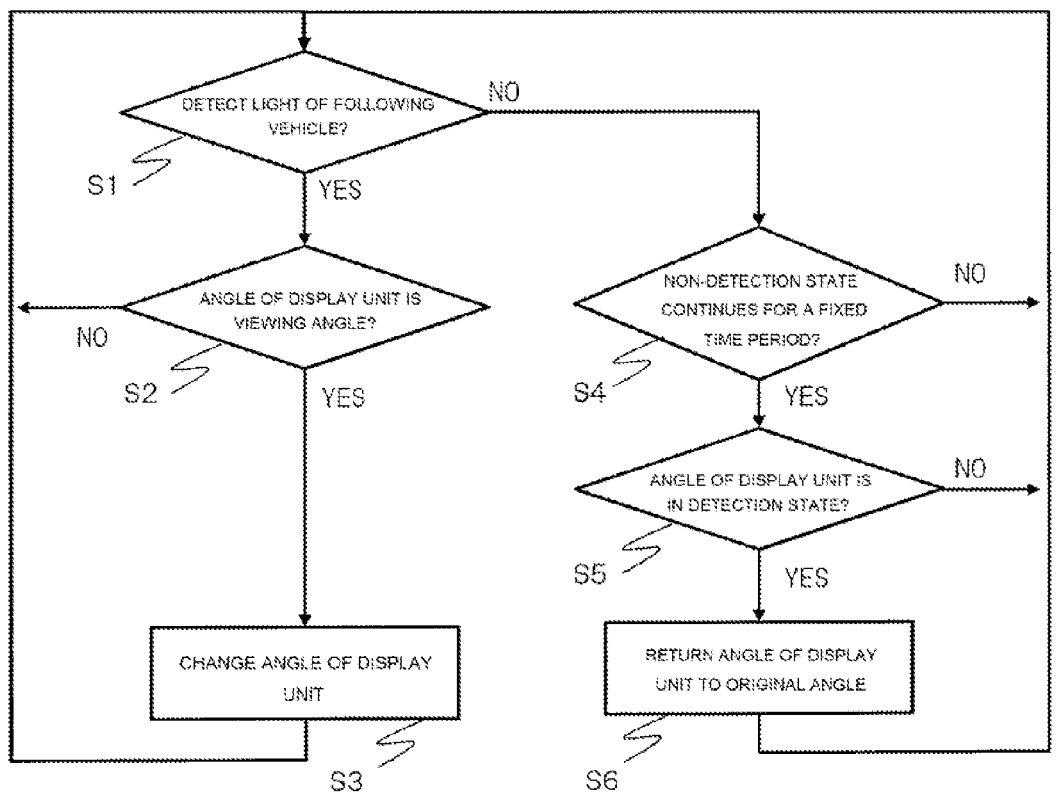
FIG. 4 is an operation flowchart of the same.

FIG. 4 is an operation flowchart of the vehicle-mounted electronic device of the above described embodiment.

As described above, the sensor 15 is for detecting illumination from a following vehicle. When the sensor 15 detects illumination (light) of the following vehicle (S1: Yes), the control unit 11 determines whether or not a present opening angle of the display unit 9 is a normal viewing angle (S2).

When the opening angle of the display unit 9 is determined as the normal viewing angle as a result (S2: Yes), the angle of the display unit 9 is changed by the drive unit 10 (S3), the display unit 9 is rotated in a direction in which the opening angle (θ) of the display unit 9 with respect to the main body case 8 becomes smaller as shown in FIG. 5, and thereafter, the flow returns to the operation of step S1.

Figure 5:
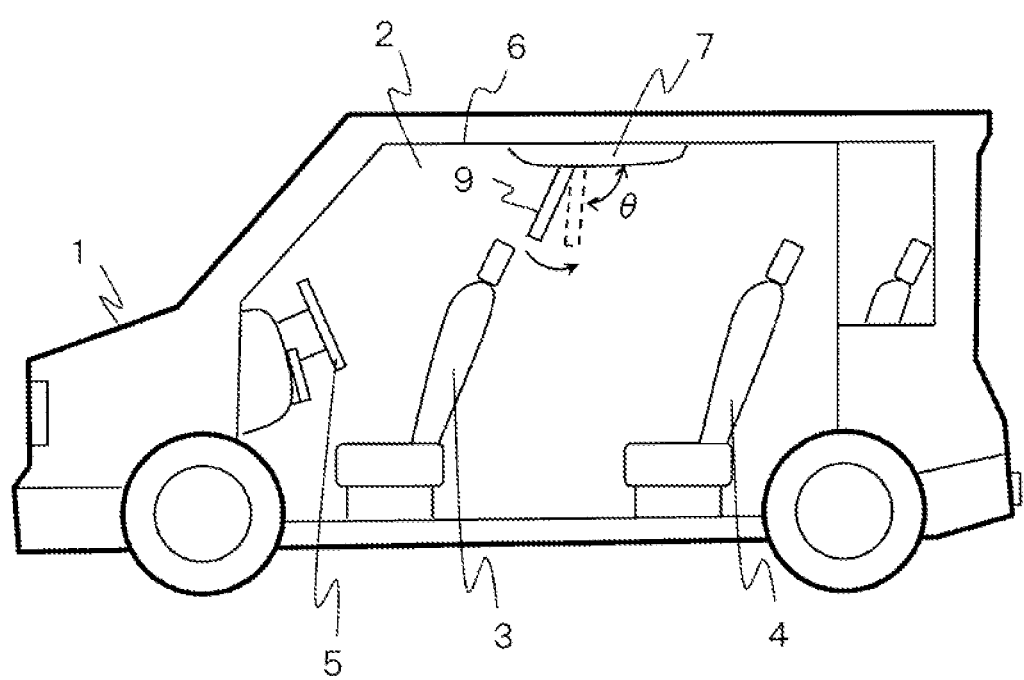
FIG. 5 is a view showing the vehicle loaded with the vehicle-mounted electronic device of the same.

FIG. 5 shows the state in which the display unit 9 is rotated in the direction in which the opening angle (θ) of the display unit 9 with respect to the main body case 8 becomes small (from the state shown by the solid line to the state shown by the broken line), with change of the angle of the above described display unit 9.

Figure 6:
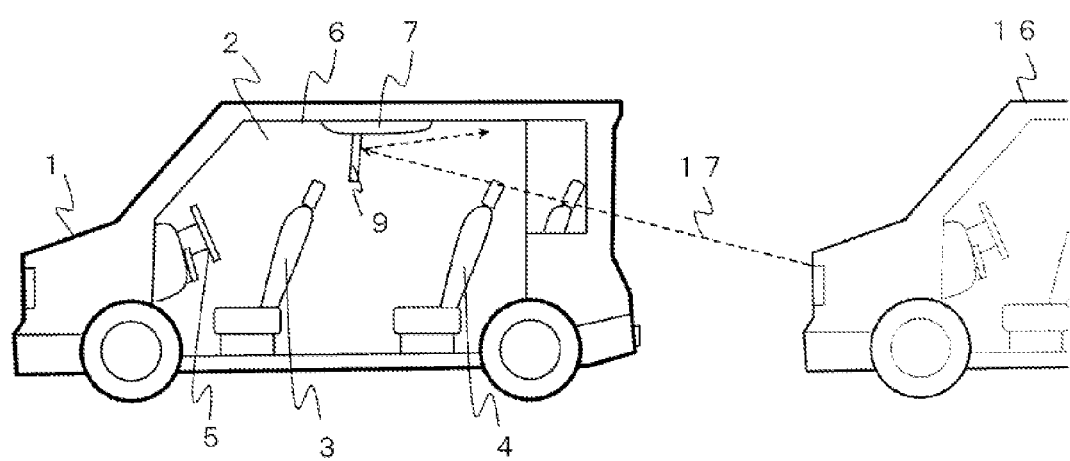
FIG. 6 is a view showing the vehicle loaded with the vehicle-mounted electronic device of the same.

FIG. 6 is a view for explaining the manner of the illumination 17 of the following vehicle 16 reflecting on the display unit 9 in the state in which the opening angle (θ) with respect to the main body case 8 of the display unit 9 has become smaller.

As shown in this drawing, when the present opening angle of the display unit 9 is determined as the normal viewing angle after the sensor 15 detects illumination of the following vehicle, and the display unit 9 rotates to be in the state in which the opening angle (θ) with respect to the main body case 8 becomes smaller, the fellow passenger sitting in the rear seat 4 hardly feels glare, and the video becomes easy to see, even if the illumination 17 from the following vehicle 16 is incident on the display unit 9, because the light of the illumination reflects in the direction of the ceiling surface 6.

Note that the opening angle of the display unit 9 that needs to be changed in step S3, namely, the rotation angle of the display unit 9 is as small as about five degrees to 10 degrees. Such a rotation angle is sufficient that reduces glare by reflection light, which the fellow passenger sitting in the rear seat 4 feels, and even if a rotation angle is not taken to be larger than necessary, there is no hindrance in viewing the video shown on the display unit 9.

When the distance from the following vehicle 16 becomes larger in the state in which viewing the display unit 9 is continued in the state of FIG. 6, the reflection angle of the illumination on the display unit 9 also changes, and the fellow passenger sitting in the rear seat 4 does not feel glare by the reflection light any more. In this case, in order to make it easier for the fellow passenger sitting in the rear seat 4 to view the display unit 9, the opening angle (θ) of the display unit 9 is returned to the state of FIG. 1. However, the distance from the following vehicle 16 changes every moment, and therefore, if the opening angle (θ) of the display unit 9 is changed too frequently, it is likely to be difficult to view the video on the contrary.

Consequently, in the present embodiment, the opening angle (θ) is kept for a while after the display unit 9 is once rotated and the opening angle (θ) with respect to the main body case 8 is made smaller. Specifically, in the flow shown in FIG. 4, when the sensor 15 does not detect illumination of the following vehicle in step S1 (S1: No), it is determined whether the state in which the sensor 15 does not detect illumination of the following vehicle continues for a predetermined time period or more (S4), and when continuation of the non-detection state of illumination of the following vehicle is less than the predetermined time period (S4: No), the flow returns to step S1 and the operation is repeated.

Meanwhile, when continuation of the non-detection state of illumination of the following vehicle is the predetermined time period or more (S4: Yes), it is determined whether or not the present opening angle of the display unit 9 is a normal viewing angle by the control unit 11 (S5). When the opening angle of the display unit 9 is not the normal viewing angle (S5: No) as a result of the determination, the flow returns to step S1 and the operation is repeated.

When the opening angle of the display unit 9 is the normal viewing angle (S5: Yes) as a result of the determination in step S5, the display unit 9 is rotated in the direction in which the opening angle of the display unit 9 with respect to the main body case 8 becomes larger and is returned to the original state shown in FIG. 1 (S6), by the drive unit 10. Thereafter, the flow is returned to step S1, and the operation is repeated.

As above, the vehicle-mounted electronic device according to the present invention includes the main body case to be attached to the ceiling surface of a vehicle, the display unit attached to the main body case to be openable downward and closable, the drive unit that drives the display unit to open and close, and the control unit connected to the drive unit, and is configured such that the sensor that detects illumination from a following vehicle is provided in at least one of the display unit and the main body case, and the control unit rotates the display unit by means of the drive unit when the sensor detects illumination from the following vehicle.

Therefore, illumination from the following vehicle reflects on the display unit, and the fellow passenger sitting in the rear seat does not feel the glare due to the reflection light.

INDUSTRIAL APPLICABILITY

The present invention provides art that reduces the influence by illumination of the following vehicle and makes the usage environment of the vehicle-mounted electronic device comfortable.

REFERENCE SIGNS LIST

1 Vehicle
2 Vehicle interior
3 Front seat
4 Rear seat
5 Steering wheel
6 Ceiling surface
7 Vehicle-mounted electronic device
8 Main body case
9 Display unit
10 Drive unit
11 Control unit
12 Video input unit
13 Video reproduction unit
14 Video processing unit
15 Sensor
16 Following vehicle
17 Illumination

The invention claimed is:

1. A vehicle-mounted electronic device, comprising a main body case to be attached to a ceiling surface of a vehicle, a display unit that is attached to the main body case to be openable downward and closable, a drive unit that drives the display unit to open and close, and a control unit that is connected to the drive unit, and comprising a configuration wherein
a sensor that detects illumination from a following vehicle is provided in at least one of the display unit and the main body case, and the control unit rotates the display unit by means of the drive unit, when the sensor detects illumination from a following vehicle, further comprising a configuration wherein
at an opening time of the display unit, the display unit is brought into a state in which the display unit is opened at 90 degrees or more with respect to the main body case, and when illumination from a following vehicle is detected by the sensor, the display unit is rotated, by the drive unit, in a direction in which an opening angle of the display unit with respect to the main body case becomes smaller.

2. The vehicle-mounted electronic device according to claim 1, wherein the sensor is configured by a camera.

3. The vehicle-mounted electronic device according to claim 2, wherein the sensor is provided at an outer perimeter portion of the display unit.

4. The vehicle-mounted electronic device according to claim 1, further comprising a configuration wherein
after the sensor detected illumination from a following vehicle, if a state in which no illumination from the following vehicle is detected is continued for a predetermined time period, the control unit causes the display unit to perform an opening operation.

* * * * *